(12) United States Patent
Ros

(10) Patent No.: US 11,014,842 B2
(45) Date of Patent: May 25, 2021

(54) LAMELLA FILTER TANK ASSEMBLY

(71) Applicant: United Rentals, Inc., Stamford, CT (US)

(72) Inventor: E. B. (Bart) Ros, Deventer (NL)

(73) Assignee: United Rentals, Inc., Stamford, CT (US)

( * ) Notice: Subject to any disclaimer, the term of this patent is extended or adjusted under 35 U.S.C. 154(b) by 0 days.

(21) Appl. No.: 16/522,054

(22) Filed: Jul. 25, 2019

(65) Prior Publication Data

US 2020/0031702 A1 Jan. 30, 2020

Related U.S. Application Data

(60) Provisional application No. 62/703,337, filed on Jul. 25, 2018.

(51) Int. Cl.
  *B01D 21/02* (2006.01)
  *C02F 9/00* (2006.01)
  (Continued)

(52) U.S. Cl.
  CPC ............ *C02F 9/00* (2013.01); *B01D 21/2416* (2013.01); *B01D 21/2433* (2013.01);
  (Continued)

(58) Field of Classification Search
  CPC ............ B01D 21/0024; B01D 21/0045; B01D 21/0087; B01D 21/2416; B01D 21/2433;
  (Continued)

(56) References Cited

U.S. PATENT DOCUMENTS 2,907,461 A * 10/1959 Lee .................. B01D 21/24
  210/534
3,886,064 A 5/1975 Kosonen
  (Continued)

FOREIGN PATENT DOCUMENTS

DE 4422361 A1 11/1996
WO 1999026709 A1 6/1999

OTHER PUBLICATIONS

International Search Report and Written Opinion issued in PCT/US2019/043419, dated Oct. 4, 2019.
(Continued)

*Primary Examiner* — Christopher Upton
(74) *Attorney, Agent, or Firm* — K&L Gates LLP

(57) ABSTRACT

A tank assembly for the treatment of waste streams that include settling pollutants and floating pollutants. The tank assembly includes an inlet conduit, a first compartment that includes a first drain at a bottom thereof, a second compartment that includes a second drain at a bottom thereof, a third compartment that includes a third drain at a bottom thereof, and an outlet conduit. The second compartment also includes at least a first lamella filter package disposed therein. The third compartment also includes a skimmer, an underrun member and an overrun member. A liquid flow path is defined from the inlet conduit, through the first compartment, through the second compartment and the first lamella filter pack, through the third compartment, past the skimmer, under the underrun, over the overrun and out the outlet conduit.

14 Claims, 6 Drawing Sheets

(51) Int. Cl.
    *C02F 1/00*            (2006.01)
    *B01D 21/24*         (2006.01)
    *B01D 21/00*         (2006.01)

(52) U.S. Cl.
    CPC .......... *B01D 21/2472* (2013.01); *C02F 1/001* (2013.01); *B01D 21/0045* (2013.01); *C02F 2001/007* (2013.01)

(58) Field of Classification Search
    CPC ............ B01D 21/2472; B01D 17/0211; B01D 17/0214
    USPC ........ 210/802, 803, 519, 521, 523, 534, 540
    See application file for complete search history.

(56) References Cited

U.S. PATENT DOCUMENTS

| | | | | |
|---|---|---|---|---|
| 4,123,365 A * | 10/1978 | Middelbeek | ....... | B01D 17/0211 210/521 |
| 4,278,545 A * | 7/1981 | Batutis | ............... | B01D 17/0214 210/521 |
| 4,681,683 A | 7/1987 | Lindstol | | |
| 4,722,800 A * | 2/1988 | Aymong | ............ | B01D 17/0211 210/802 |
| 4,980,070 A * | 12/1990 | Lieberman | ......... | B01D 17/0214 210/802 |
| 5,554,301 A * | 9/1996 | Rippetoe | ............ | B01D 17/0211 210/802 |
| 6,079,571 A * | 6/2000 | Stowell | .............. | B01D 17/0211 210/521 |
| 8,211,302 B2 | 3/2012 | Page | | |
| 8,871,089 B2 | 10/2014 | Early | | |
| 2004/0222149 A1* | 11/2004 | Abrams | ............. | B01D 17/0211 210/519 |
| 2008/0006304 A1* | 1/2008 | Treherne | ............ | B01D 21/2472 210/513 |
| 2015/0068969 A1* | 3/2015 | Stagg | ................. | B01D 21/0045 210/521 |
| 2016/0207808 A1 | 7/2016 | Castellanos Roldan | | |

OTHER PUBLICATIONS

Extended European Search Report for Application No. 19794872.2 dated Feb. 18, 2021.

\* cited by examiner

LAMELLA FILTER TANK ASSEMBLY

CROSS REFERENCE TO RELATED APPLICATIONS

This application claims the benefit of U.S. Provisional Application No. 62/703,337, filed Jul. 25, 2018, the entirety of which is incorporated herein by reference.

FIELD OF THE INVENTION

The present invention relates generally to lamella filters, and more particularly to a lamella filter tank assembly.

BACKGROUND OF THE INVENTION

Technology for the separation of solid or settling particles from liquids is known. Technology for the separation of floating pollution, such as oils, from liquids is also known. A need exists for the combination of these two types of technology for scenarios where the liquid (e.g., waste water) includes both oils and solid particles.

SUMMARY OF THE INVENTION

In accordance with a first aspect of the present invention there is provided a tank assembly for the treatment of waste streams that include settling pollutants and floating pollutants. The tank assembly includes an inlet conduit, a first compartment that includes a first drain at a bottom thereof, a second compartment that includes a second drain at a bottom thereof, a third compartment that includes a third drain at a bottom thereof, and an outlet conduit. The second compartment also includes at least a first lamella filter package disposed therein. The third compartment also includes a skimmer, an underrun member and an overrun member. A liquid flow path is defined from the inlet conduit, through the first compartment, through the second compartment and the first lamella filter pack, through the third compartment, past the skimmer, under the underrun, over the overrun and out the outlet conduit. In a preferred embodiment, the first compartment includes a flowbreaker that is positioned at the end of the inlet conduit in the first compartment. Preferably, the inlet conduit divides into first and second sections, the flowbreaker is positioned at an end of the first section, and a second flowbreaker is positioned at an end of the second section.

In a preferred embodiment, the overrun has an upper edge that defines a first height, the underrun defines a lower edge that defines second height, and the first height is higher than the second height. In a preferred embodiment, the tank assembly includes a sludge removal conduit that is in fluid communication with the first, second and third drains. Preferably, the first compartment includes a first lower cone section that includes the first drain therein, the second compartment includes a second lower cone section that includes the second drain therein, and the third compartment includes a third lower cone section that includes the third drain therein.

In a preferred embodiment, the tank assembly includes a cleaning system that includes a first line that inputs liquid into the first cone and/or first drain, a second line that inputs liquid into the second cone and/or second drain, and a third line that inputs liquid into the third cone and/or third drain. Preferably, the second compartment includes a plurality of lamella filter packs positioned in series within the liquid flow path. It will be appreciated that a floating pollutants path is defined from the inlet conduit, through the first compartment, through the second compartment and the first lamella filter pack, into the third compartment and into the skimmer.

In accordance with another aspect of the present invention there is provided a method of treating a waste stream that includes liquid, settling pollutants and floating pollutants in a tank assembly. The method includes flowing the liquid into an inlet conduit, flowing the liquid through a first compartment that includes a first drain at a bottom thereof, where a first portion of settling pollutants settle to the first drain, flowing the liquid into a second compartment and through a first lamella filter package disposed therein, where a second portion of settling pollutants settle to a second drain at a bottom of the second compartment, and flowing the liquid into a third compartment that includes a third drain at a bottom thereof. The third compartment also includes a skimmer, an underrun member and an overrun member. A third portion of settling pollutants settle to the third drain and the floating pollutants are removed by the skimmer. The method also includes flowing the liquid under the underrun, flowing the liquid over the overrun, and flowing the liquid through the outlet conduit.

The present invention includes a lamella filter tank, assembly and system. In a preferred embodiment of the invention, the system is mobile. However, this is not a limitation on the present invention. The present invention combines the removal of floating pollution and the removal of settling pollution into one system and includes multiple and different connections for removal of oil and removal of settling pollutants.

In a preferred embodiment, the tank includes three separate settling compartments. Water or other liquid enters the first compartment from a pipe at one end and the liquid flows through the pipe to the top where a flowbreaker is positioned. In the flowbreaker and the first compartment, the water is divided over the total width of the system to reduce the flow speed or velocity of the water, which causes particles to start settling out or start floating.

Next, the particles enter the second compartment where the vertical lamella packages are located. In the lamella packages, the flow is divided over a plurality of parallel channels. Each channel only receives a small amount of the flow of the liquid. The speed and turbulence of the water in each channel is at or close to zero between each of the plates in each channel. Because the turbulence is at or below zero, the small particles start settling or floating. In other words, the lamella filters create a zone with very little or no turbulence, and, because the particles start to cling or bind together, they start to settle toward the bottom. Therefore, in the lamella packs, the turbulence is reduced and the binding capabilities of particles are stimulated or increased.

The particles then enter the third compartment. This compartment preferably includes an underrun and an overrun that is directing the desired flow pattern or flow path in the lamella filter tank so when oil particles are floating there is no flow going over the top of the tank because then the removed oily pollution will be removed toward the effluent side of the tank. This is why the underrun is provided. And, the overrun is provided to maintain the right level and the constant level in the tank.

After settling of particles takes place in each tank, the particles end up in the cone under each compartment. As a result, the user can choose, based on taking samples, which sludge they want to pump from the system to a sludge dewatering tank or the like. Therefore, if the user wants to reuse any of the sludges (from any of the cones), the user can open one of the cones separately and send specifically that solid to a desired process.

In the second compartment, just behind the lamella packs in the flow path, in a preferred embodiment, a floating skimmer is included. The skimmer allows the user to separately transport the removed oil to a different process. The four hatches on top of the roof make it possible to clean the complete system from the top. With these hatches there is no corner which cannot be reached with a mobile high pressure cleaner.

It will be appreciated that the inventive tank assembly disclosed herein is preferably mobile, includes vertical lamella packages in a mobile system, has three flush sludge removal systems at the bottom of each hopper or cone, removes settling and floating pollution at the same time, includes a skimmer in front of the underrun, separates different sludges within each compartment, and is a fully closed system.

Furthermore, the tank assembly can be used with the dewatering box taught in U.S. patent application Ser. No. 16/522,070, filed simultaneously herewith, the entirety of which is incorporated herein by reference. The sludge that is removed from the bottom of the compartments can be pumped into or otherwise inserted into the dewatering box so that the sludge can be further dewatered.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
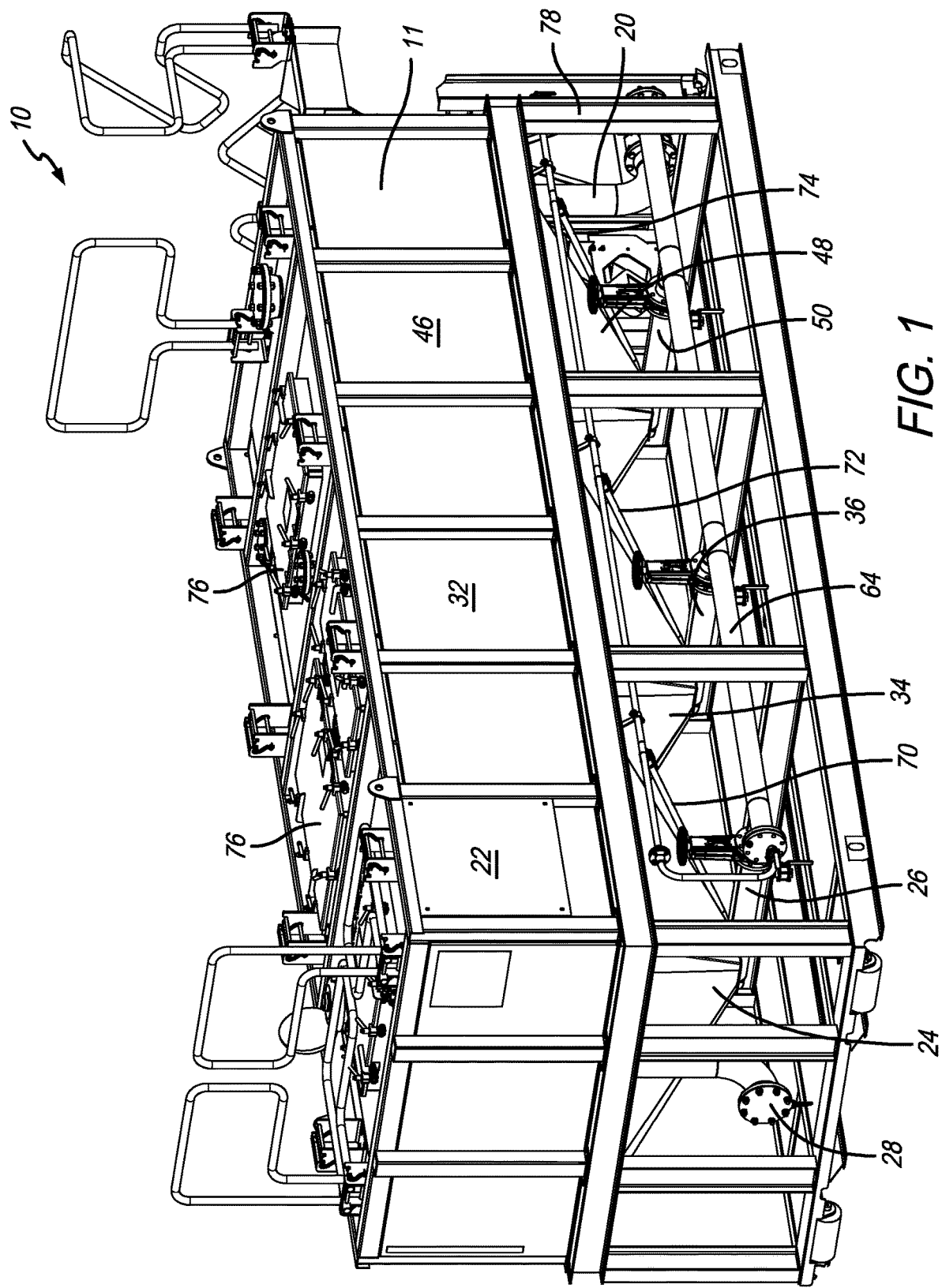
FIG. 1 is a perspective view of a lamella filter tank assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Figure 2:
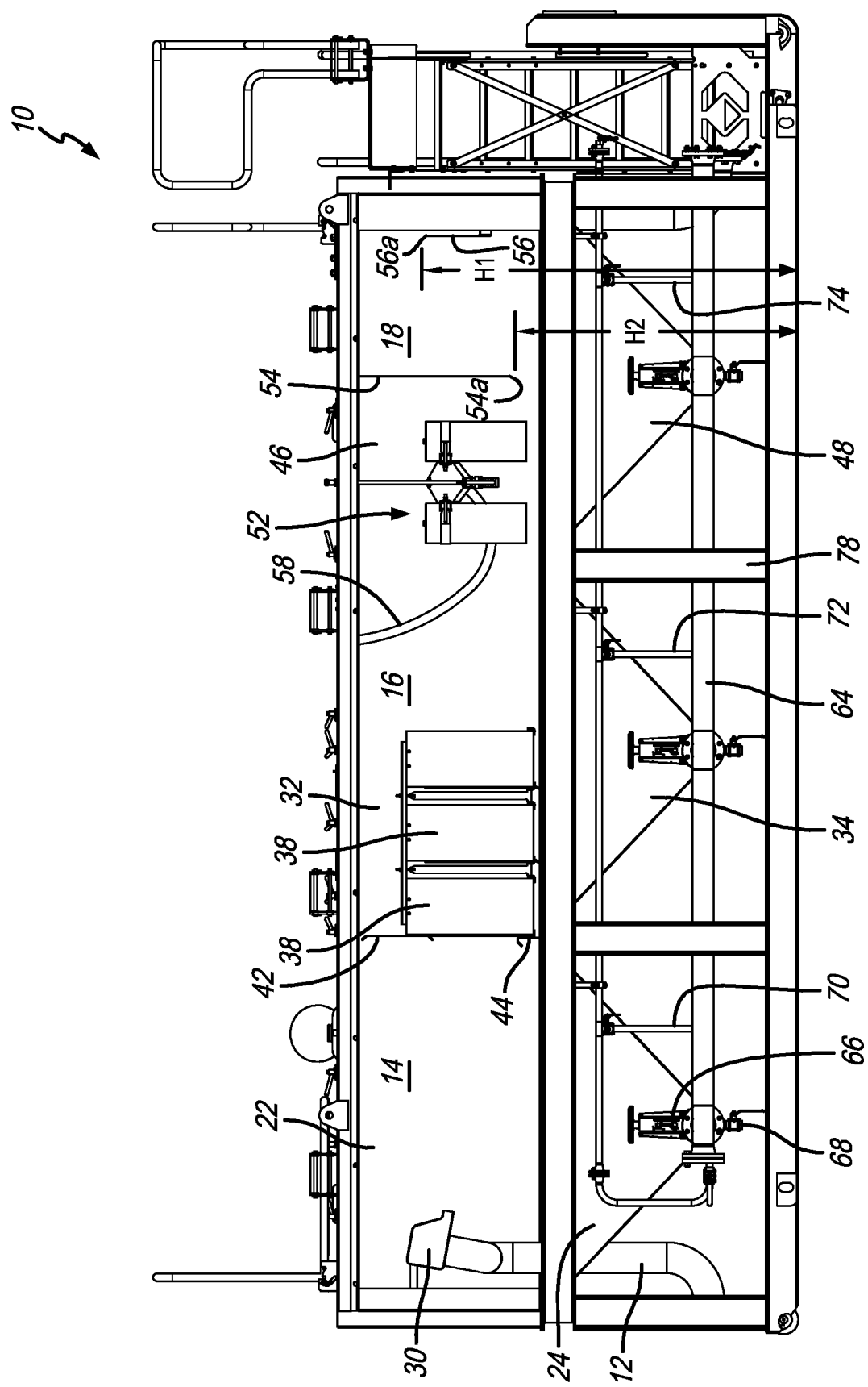
FIG. 2 is a side elevational view in partial cross-section of the lamella filter tank assembly.

Referring now to the drawings, which are for purposes of illustrating the present invention and not for purposes of limiting the same, FIGS. 1-6 show a lamella filter tank assembly 10 that is used for the treatment of waste streams that include settling pollutants and/or floating pollutants. As shown in FIG. 2, generally, the tank assembly 10 includes a tank 11 that includes an inlet conduit 12, a first compartment 14, a second compartment 16, a third compartment 18 and an outlet conduit 20.

Figure 4:
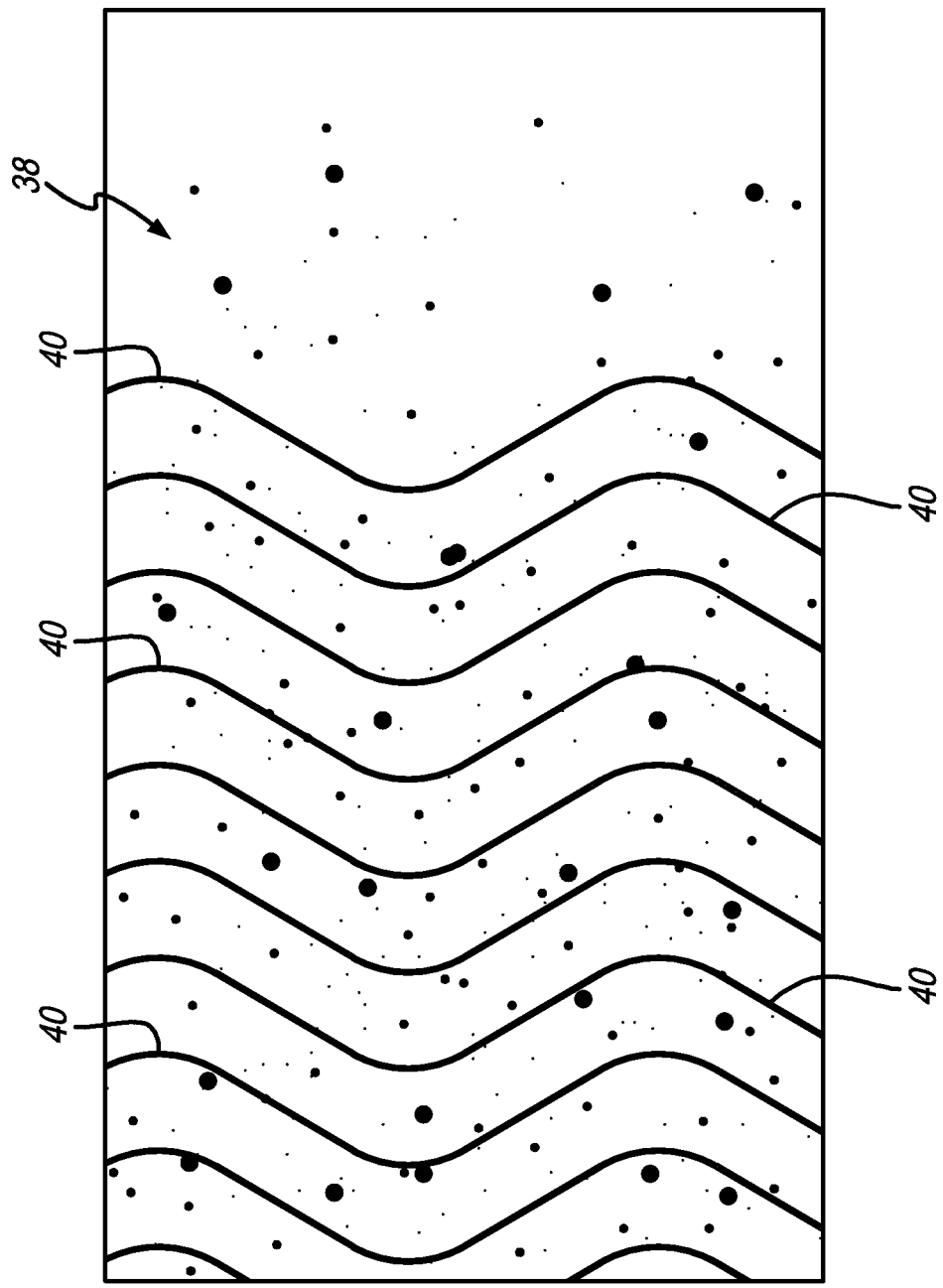
FIG. 4 is a side elevational view of a portion of a lamella filter package with settling particles therein.
Figure 5:
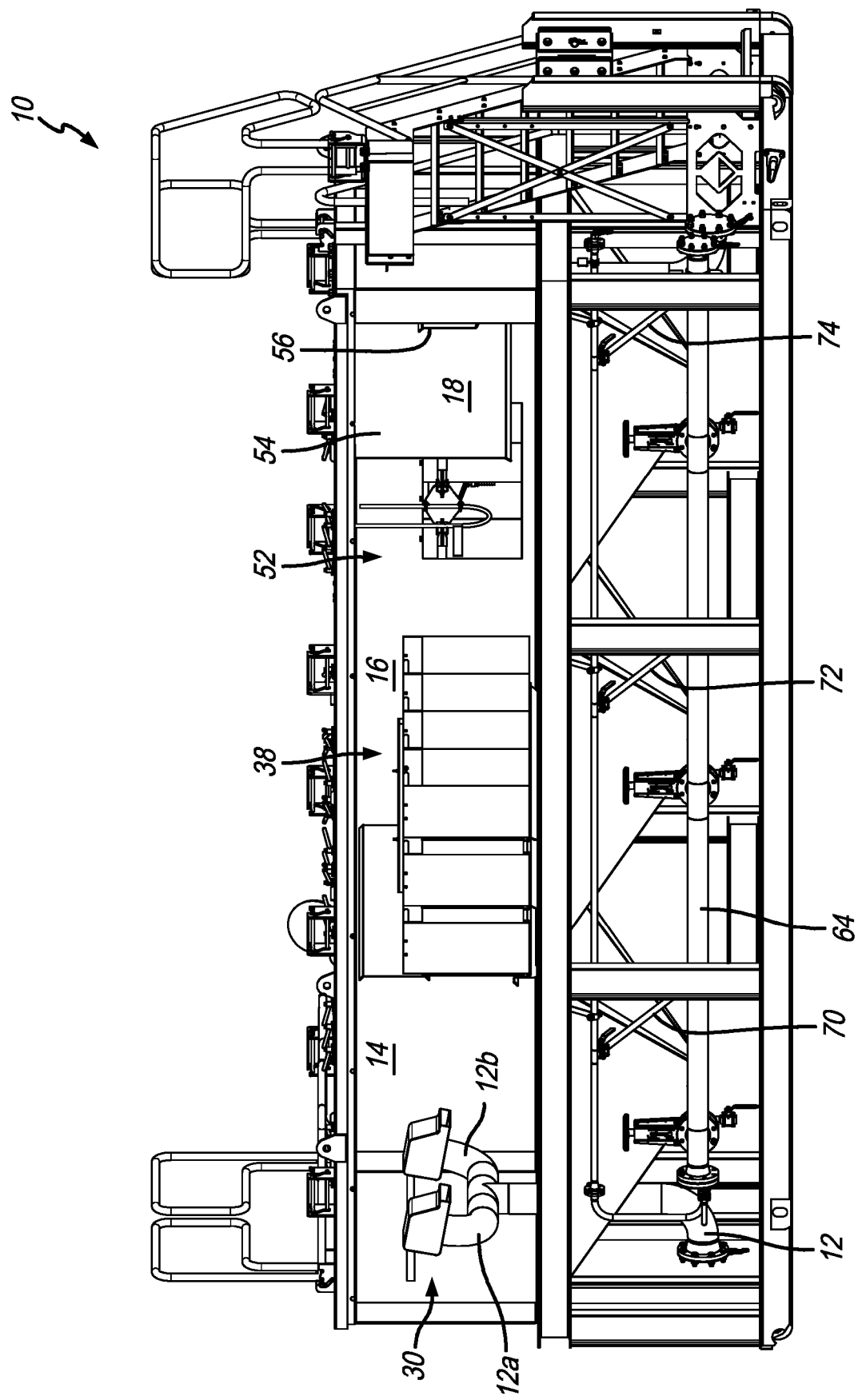
FIG. 5 is a perspective view in partial cross-section of the lamella filter tank assembly.

The first compartment 14 preferably includes a first upper section 22, a first lower cone section 24 and a first drain 26 at the bottom of the first compartment. The inlet conduit 12 communicates the interior of the tank 11 with the exterior, e.g., by a flange connection 28 or the like. In a preferred embodiment, the inlet conduit 12 includes a flowbreaker 30, on the end thereof, which breaks the flow of the entering liquid and begins to slow it down and decrease turbulence. As shown in FIG. 4, the inlet conduit 12 divides into first and second sections 12a and 12b and a flowbreaker 30 is positioned at the end of both sections.

The second compartment 16 preferably includes a second upper section 32, a second lower cone section 34 and a second drain 36 at the bottom of the second compartment 16. In a preferred embodiment, the second compartment 16 includes at least one and preferably a plurality of lamella filter packages 38 disposed therein. As shown in FIG. 4, each lamella filter package 38 preferably include a plurality of parallel plates 40 therein that define space therebetween for liquid to flow through. Preferably, the plates 40 are arranged in a vertical arrangement. In a preferred embodiment, the plates 40 have a wave form shape. However, this is not a limitation on the present invention and other shapes or arrangements, such as flat, zig-zag, etc., are within the scope of the invention. Preferably, the second compartment 16 includes upper and lower shields 42 and 44 positioned above and below the lamella filter packages 38 to force liquid to enter the lamella filter packages 38. As the liquid flows through the lamella filter packages 38, the speed of the water is reduced, solid particles begin to coagulate and many of the particles settle to the bottom of the second compartment.

The third compartment 18 preferably includes a third upper section 46, a third lower cone section 48 and a third drain 50 at the bottom of the third compartment 18. In a preferred embodiment, as shown in FIG. 2, the third compartment 18 also includes a skimmer 52, an underrun member 54 and an overrun member 56. As discussed below, the skimmer 52 is used to remove floating pollutants (see the floating pollutants in FIG. 3). Any type of skimmer is within the scope of the present invention. The skimmer 52 can also include a hose 58 or other conduit for expelling the pollutants from the tank 11. The underrun member 54 keeps the floating pollutants in the third compartment 18 so they can be removed by the skimmer 52 instead of exiting over the overrun member 56. The overrun member 56 is provided to provide a stable water level. It should be understood that the water level is just above the upper edge 56a of the overrun member 56.

Water that flows over the top of the overrun member 56 flows or spills into a trough 60 that includes a drain to the outlet conduit 20. As shown in FIG. 2, the upper edge 56a of the overrun member 56 defines a first height H1 and the lower edge 58a of the underrun member 58 defines a second height H2 and the first height H1 is higher than the second height H2. In other words, because the overrun member 56 determines the water height, the lower edge of the underrun member 58 is positioned below the water height.

Figure 3:
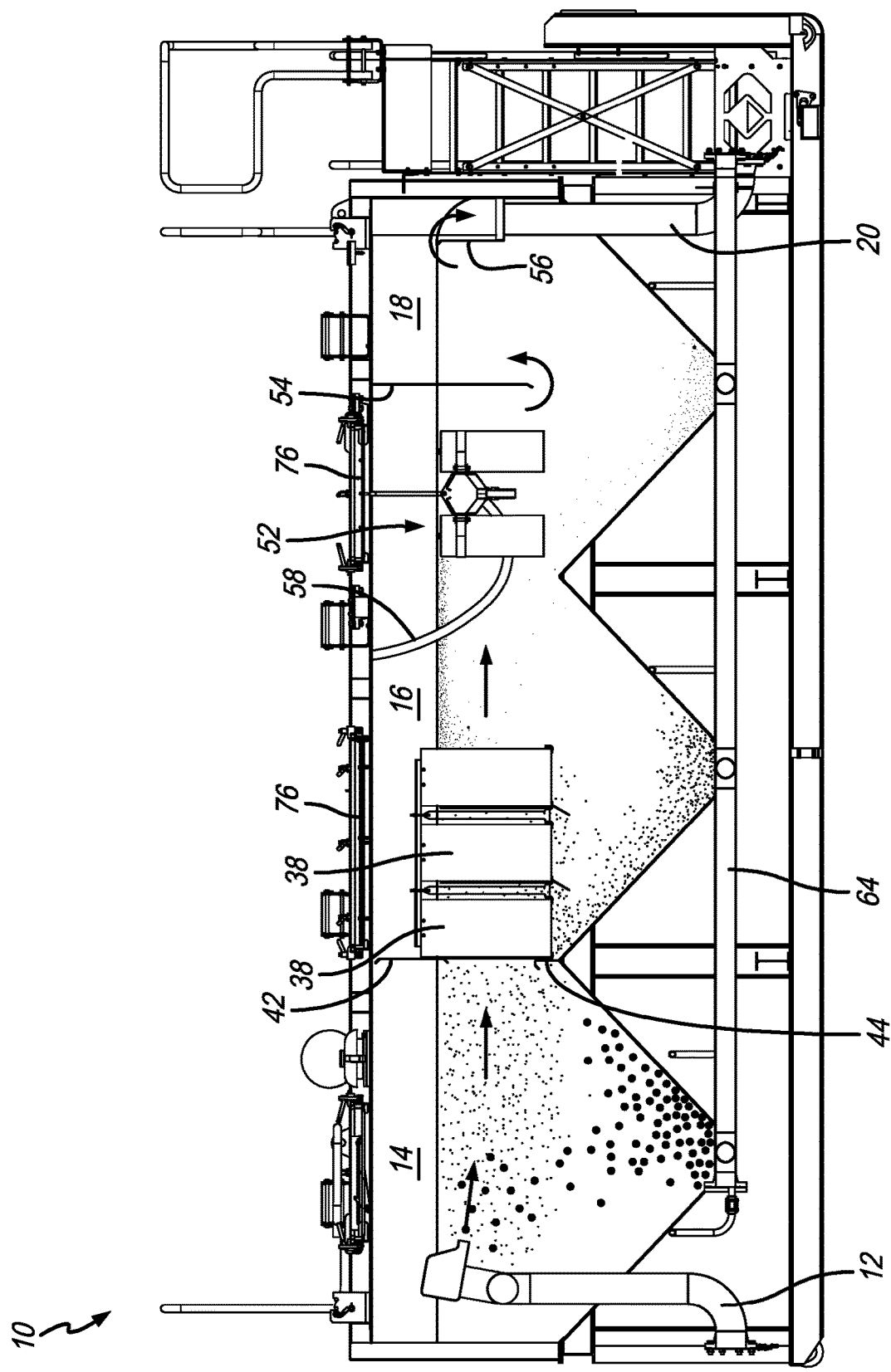
FIG. 3 is a cross-sectional side elevational view of the lamella filter tank assembly.

From a reading of the above description, it should be understood that a liquid flow path is defined as shown by the arrows in FIG. 3. The flow path flows from the inlet conduit 12 (in through the flange connection), out of the flowbreaker(s) 30, through the first compartment 14, through the second compartment 16 and the lamella filter packages 38, through the third compartment 18, past the skimmer 52, under the underrun 54, over the overrun 56 into the trough 60, through the drain and out the outlet conduit 20. As the liquid follows this flow path solid pollutants settle in all three compartments and floating pollutants are removed in the skimmer 52. Therefore, a floating pollutants path is defined from the inlet conduit 12, through the first compartment 14, through the second compartment 16 and the first lamella filter packages 38, into the third compartment 18 and into the skimmer 52.

In a preferred embodiment, the tank assembly 10 includes a sludge removal system that includes a sludge removal conduit 64 that is in fluid communication with the first, second and third drains 65. Each of the drains 65 include a valve 66 in line between the drain and the sludge removal conduit 64. As a result, the valve associated with a certain compartment can be opened so that the sludge therein can be removed. The ability to remove sludges from the different compartments and then disperse them as desired is an advantage of the present invention. In a preferred embodiment, each compartment also include a test valve 68 that is separate from the conduits that run to the sludge removal conduit 64. The test valves 68 allow a user to remove a small amount of sludge from the subject compartment for testing.

In a preferred embodiment, the tank assembly 10 includes a cleaning and/or flushing system that includes a first line 70 that inputs liquid into the first cone, a second line 72 that inputs liquid into the second cone, and a third line 74 that inputs liquid into the third cone. Each line preferably includes a valve so that water or other cleaning liquid can be sprayed inside the cone for cleaning and flushing purposes.

Figure 6:
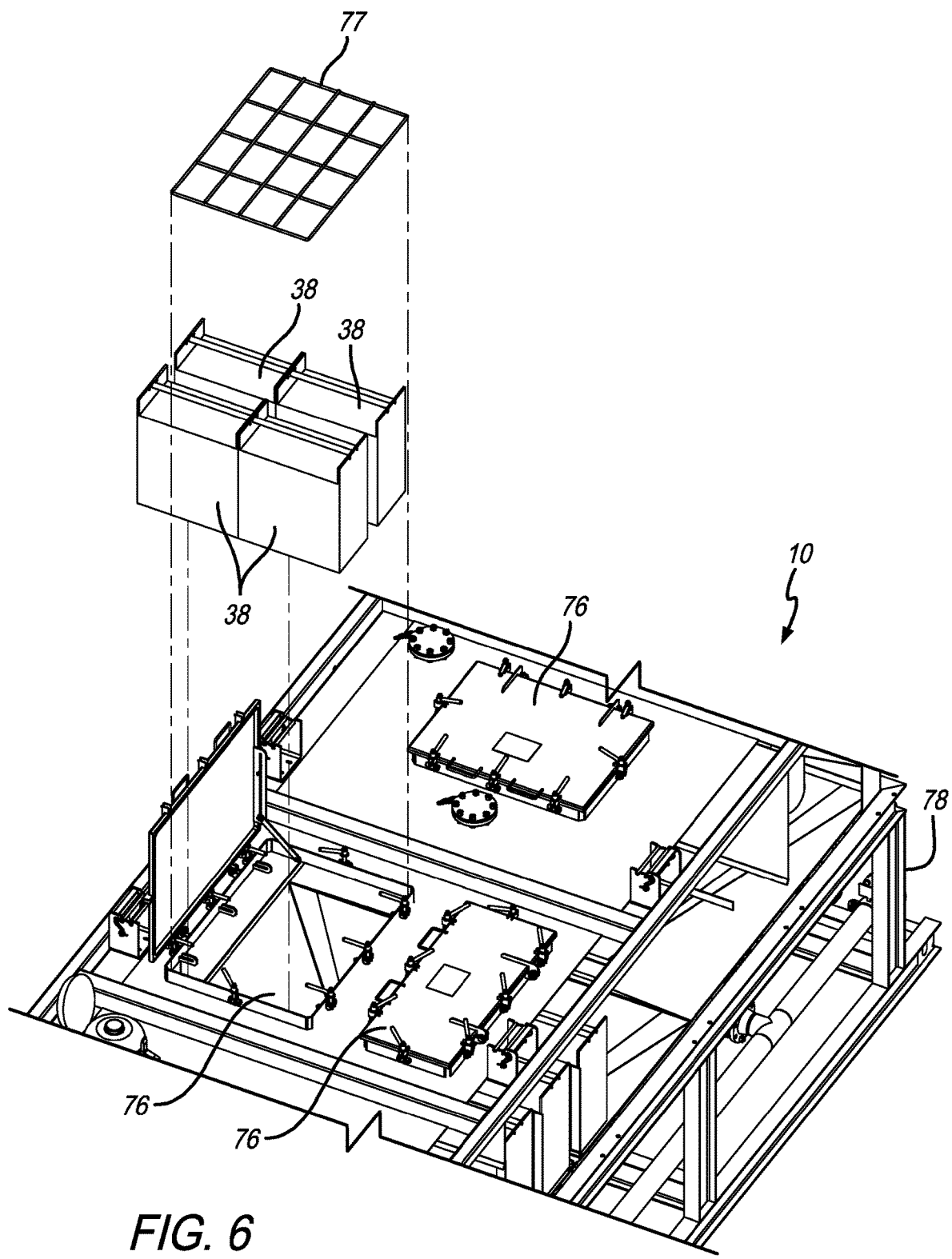
FIG. 6 is the perspective view of a lamella filter tank assembly with the lamella filter packages exploded therefrom.

As shown in FIG. 1, in a preferred embodiment, the tank assembly 10 is a fully closed airtight system that is sealed. This allows a user to, e.g., inject a nitrogen layer to protect any oil inside from being explosive. Nitrogen protects from oxygen getting in and keeps fumes inside. Preferably, the tank assembly 10 includes a plurality of hatches 76 that can be opened to either remove components, such as the lamella filter packages 38 (see the lamella filter packages 38 outside of the tank 11 in FIG. 6) or skimmer 52, or to provide access to the various compartments so that they can easily be cleaned. FIG. 6 also shows a grate 77 that is removably positioned in the hatch 76. The tank 11 is preferably positioned on a frame 78 so that the tank 11 can be held in an upright position. This also allows the tank assembly 11 to be mobile as it can by moved onto and off of a truck or other vehicle as a unit.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. It will be appreciated that any dimensions given herein are only examplary and that none of the dimensions or descriptions are limiting on the present invention.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A tank assembly for the treatment of waste streams that include settling pollutants and floating pollutants, the tank assembly comprising:
   an inlet conduit,
   a first compartment having a first test valve, the first compartment including a first drain at a bottom thereof,
   a second compartment having a second test valve, the second compartment including a second drain at a bottom thereof, wherein the second compartment also includes at least a first lamella filter package disposed therein,
   a third compartment having a third test valve, the third compartment including a third drain at a bottom thereof, wherein the third compartment also includes a skimmer, an underrun member and an overrun member,
   and an outlet conduit, wherein a liquid flow path is defined from the inlet conduit, through the first compartment, through the second compartment and the first lamella filter pack, through the third compartment, past the skimmer, under the underrun, over the overrun and out the outlet conduit, wherein the tank assembly is structured to operate in a sealed, airtight state.

2. The tank assembly of claim 1 wherein the first compartment includes a flowbreaker that is positioned at the end of the inlet conduit in the first compartment.

3. The tank assembly of claim 2 wherein the inlet conduit divides into first and second sections, wherein the flowbreaker is positioned at an end of the first section, and wherein a second flowbreaker is positioned at an end of the second section.

4. The tank assembly of claim 1 wherein the overrun has an upper edge that defines a first height, wherein the underrun defines a lower edge that defines second height, and wherein the first height is higher than the second height.

5. The tank assembly of claim 1 further comprising a sludge removal conduit, wherein the sludge removal conduit is in fluid communication with the first, second and third drains.

6. The tank assembly of claim 1 wherein the first compartment includes a first lower cone section that includes the first drain therein, wherein the second compartment includes a second lower cone section that includes the second drain therein, and wherein the third compartment includes a third lower cone section that includes the third drain therein.

7. The tank assembly of claim 1 further comprising a cleaning system that includes a first line that inputs liquid into the first lower cone section, a second line that inputs liquid into the second lower cone section, and a third line that inputs liquid into the third lower cone section.

8. The tank assembly of claim 1 further comprising a plurality of lamella filter packs positioned in series within the liquid flow path.

9. The tank assembly of claim 1 wherein a floating pollutants path is defined from the inlet conduit, through the first compartment, through the second compartment and the first lamella filter pack, into the third compartment and into the skimmer.

10. A tank assembly for the treatment of waste streams that include settling pollutants and floating pollutants, the tank assembly comprising:
   an inlet conduit,
   a first compartment having a first test valve, the first compartment including a first drain at a bottom thereof, wherein the first compartment includes a first lower cone section that includes the first drain therein, wherein the inlet conduit divides into first and second sections, wherein a first flowbreaker is positioned at an end of the first section, and wherein a second flowbreaker is positioned at an end of the second section,
   a second compartment having a second test valve, the second compartment including a second drain at a bottom thereof, wherein the second compartment also includes at least a first lamella filter package disposed therein, and wherein the second compartment includes a second lower cone section that includes the second drain therein,
   a third compartment having a third test valve, the third compartment including a third drain at a bottom thereof, wherein the third compartment also includes a skimmer, an underrun member and an overrun member, wherein the overrun has an upper edge that defines a first height, wherein the underrun defines a lower edge that defines second height, wherein the first height is higher than the second height, and wherein the third compartment includes a third lower cone section that includes the third drain therein,
   an outlet conduit, and
   a sludge removal conduit, wherein the sludge removal conduit is in fluid communication with the first, second and third drains,
   wherein a liquid flow path is defined from the inlet conduit, through the first compartment, through the second compartment and the first lamella filter pack, through the third compartment, past the skimmer, under the underrun, over the overrun and out the outlet conduit, and wherein a floating pollutants path is defined from the inlet conduit, through the first compartment, through the second compartment and the first lamella filter pack, into the third compartment and into the skimmer, and wherein the tank assembly is structured to operate in a sealed, airtight state.

11. The tank assembly of claim 10 further comprising a cleaning system that includes a first line that inputs liquid into the first cone, a second line that inputs liquid into the second cone, and a third line that inputs liquid into the third cone.

12. The tank assembly of claim 11 further comprising a plurality of lamella filter packs positioned in series within the liquid flow path.

13. A method of treating a waste stream that includes liquid, settling pollutants and floating pollutants in a tank assembly, the method comprising the steps of:
   flowing the liquid into an inlet conduit,
   flowing the liquid through a first compartment having a first test valve, the first compartment including a first drain at a bottom thereof, wherein a first portion of settling pollutants settle to the first drain,
   flowing the liquid into a second compartment having a second test valve and through a first lamella filter package disposed therein, wherein a second portion of settling pollutants settle to a second drain at a bottom of the second compartment,
   flowing the liquid into a third compartment having a third test valve, the compartment including a third drain at a bottom thereof, wherein the third compartment also includes a skimmer, an underrun member and an overrun member, wherein a third portion of settling pollutants settle to the third drain, and wherein the floating pollutants are removed by the skimmer,
   flowing the liquid under the underrun,
   flowing the liquid over the overrun, and
   flowing the liquid through the outlet conduit, and wherein the waste stream is treated in sealed, airtight conditions.

14. The method of claim 13 wherein the tank assembly includes a sludge removal conduit that is in fluid communication with the first, second and third drains.

* * * * *